United States Patent
Schmidtke et al.

(10) Patent No.: US 8,625,429 B2
(45) Date of Patent: Jan. 7, 2014

(54) SCHEDULING DATA OVER MULTIPLE NETWORK INTERFACES

(76) Inventors: Jakub Schmidtke, Waterloo (CA); Robert Robinson, Waterloo (CA)

(*) Notice: Subject to any disclaimer, the term of this patent is extended or adjusted under 35 U.S.C. 154(b) by 31 days.

(21) Appl. No.: 13/329,904

(22) Filed: Dec. 19, 2011

(65) Prior Publication Data

US 2012/0320748 A1    Dec. 20, 2012

Related U.S. Application Data

(60) Provisional application No. 61/424,373, filed on Dec. 17, 2010.

(51) Int. Cl.
*H04L 12/26* (2006.01)
(52) U.S. Cl.
USPC .......................................................... 370/235
(58) Field of Classification Search
USPC ...................................... 370/235, 230.1, 231
See application file for complete search history.

(56) References Cited

U.S. PATENT DOCUMENTS

| | | | |
|---|---|---|---|
| 7,185,121 B2* | 2/2007 | Fitzsimmons et al. | 710/26 |
| 7,424,709 B2* | 9/2008 | Neiger et al. | 718/1 |
| 7,685,286 B2* | 3/2010 | Brown et al. | 709/226 |
| 7,706,273 B2* | 4/2010 | Poletto et al. | 370/235 |
| 2002/0097724 A1* | 7/2002 | Halme et al. | 370/392 |
| 2007/0268903 A1* | 11/2007 | Nakagawa | 370/392 |
| 2008/0288771 A1* | 11/2008 | Kulakowski et al. | 713/150 |
| 2010/0031339 A1* | 2/2010 | Minnen | 726/12 |
| 2010/0329256 A1* | 12/2010 | Akella et al. | 370/392 |

* cited by examiner

*Primary Examiner* — Mark Rinehart
*Assistant Examiner* — Mohammad Anwar (57) ABSTRACT

A scheduler is configured to schedule packets in a plurality of flows to a corresponding one of a plurality of interfaces. Each of the packets includes a flow identifier for identifying a corresponding one of the plurality of flows. The scheduler include memory having instructions for execution by the processor to implement a scheduling algorithm. The scheduling algorithm person as follows. Sections within a predefined range are assigned to corresponding ones of the plurality of interfaces. For each packet, a hash function is applied to the flow identifier to obtain a hash value that is evenly distributed within the predefined range. Additionally, for each packet, it is determined in which of the sections the hash value falls and the corresponding one of the plurality of interfaces is identified accordingly.

23 Claims, 5 Drawing Sheets

Figure 1

| Hash | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Port Number | | | | | | | | | | | | | | | | |
| 0 | X | | | | | | | | | | | | | | | |
| 1 | | | | | | | | | X | | | | | | | |
| 2 | | | | X | | | | | | | | | | | | |
| 3 | | | | | | | | | | | | | X | | | |
| 4 | | | X | | | | | | | | | | | | | |
| 5 | | | | | | | | | | | X | | | | | |
| 6 | | | | | | | X | | | | | | | | | |
| 7 | | | | | | | | | | | | | | | X | |
| 8 | | X | | | | | | | | | | | | | | |
| 9 | | | | | | | | | | X | | | | | | |
| 10 | | | | | X | | | | | | | | | | | |
| 11 | | | | | | | | | | | | | | X | | |
| 12 | | | X | | | | | | | | | | | | | |
| 13 | | | | | | | | | | | | X | | | | |
| 14 | | | | | | | X | | | | | | | | | |
| 15 | | | | | | | | | | | | | | | | X |

SCHEDULING DATA OVER MULTIPLE NETWORK INTERFACES

The present invention relates generally to scheduling data over multiple network interfaces and specifically doing so in an efficient manner to reduce resource overhead.

BACKGROUND

Network devices that have more than one outgoing network interface and are processing Internet Protocol (IP) packets need to decide how outgoing packets are going to be assigned to each of the available network interfaces. Due to limitations in standard IP networks, it is not desirable to send a single packet out more than one interface. Therefore, for a given outgoing packet, the network device needs to assign this packet to one of the network interfaces, at which point the network interface will transmit this packet across the network to its destination. The process of assigning packets to network interfaces is referred to as packet scheduling or scheduling.

In many cases scheduling is done in a static manner. That is, if Interface A is available, all packets are sent via it. If, however, Interface A is no longer available all packets are sent via Interface B. For example, this is the default behavior of many multi-homed IP routers. This approach is used for a variety of reasons inherent in way that IP networks address and route packets. However, there exist systems where a more advanced scheduling algorithm can yield beneficial outcomes.

More advanced scheduling algorithms fall into one of two categories; scheduling on a per-packet basis; and scheduling on a per-flow basis. When scheduling on a per-packet basis, a scheduler decides how to assign a given packet to a network interface based upon how it assigned the previous packet. An example of a simple per-packet scheduling algorithm is a round robin approach. Thus each packet is scheduled over a subsequent interface. These scheduling algorithms work best in environments where the network characteristics of each link are very similar, since network interfaces with different network characteristics can introduce packet reordering into a flow, which may be detrimental to the behavior of many flows.

Scheduling on a per-flow bases attempts to avoid this pitfall by operating on packets based on the flow to which they belong, and schedule packets from each flow over a common interface. In a per-flow scheduler, each flow is assigned to a single interface, but all interfaces can be in use at once if multiple flows are present in the system. An example of a simple per-flow scheduling algorithm is a round robin algorithm. However, the round robin algorithm is used to assign entire flows to a corresponding interface, and not individual packets. Once a flow is assigned to an interface, all the packets associated with that flow are routed over the assigned interface.

In order to manage multiple flows, a table is created to map each flow to the interface to which it is assigned. This ensures that subsequent packets will be scheduled over the proper interface. However, a table-based approach has several disadvantages. First, it is necessary to expire entries from the table, which is not a trivial exercise for stateless flows like User Data Protocol (UDP) flows. Second, it is necessary to access the table every time a packet arrives, which can be an inefficient operation for large tables or a highly complex implementation if more efficient data structures are used. Third, this approach requires that the amount of data stored be based upon the number of flows, which can grow quite large as clients make large numbers of connections. On a server, having large tables like this for each client may be highly inefficient or prohibitively expensive.

Yet further, some network systems require packet scheduling to be performed by two devices working together across a network link. For example, in a multi-interface encapsulation system, it may be necessary for both a client component and a server component to perform packet scheduling when sending packets across the encapsulation system to their destination. In such environments, it is desirable for both the client and server to be making the same scheduling decisions, to avoid the traffic sent in one direction be subject to different network conditions than traffic being sent in the other direction. For example, if a Transmission Control Protocol (TCP) stream is scheduled across a high speed, low latency interface but the acknowledgements are scheduled across a high-latency interface, then the TCP stream will throttle itself unnecessarily because TCP will incorrectly interpret the slow acknowledgments as a slow network. Thus, in order to ensure that both the client and server are scheduling packets across the same network link, the table needs to be maintained by both devices. Further, synchronization data needs to be sent between the devices for each new flow, increasing the bandwidth overhead.

Accordingly, it is desirable to implement a scheduling algorithm that reduces the system overhead required for current implementations.

SUMMARY OF THE INVENTION

The scheduling algorithms described herein address scheduling of packets on a per-flow basis in an approach that reduces both the amount of memory and computational power used by each device, and the bandwidth overhead necessary to synchronize two devices across a network.

Thus, in accordance with an aspect of the present invention there is provided a scheduler configured to schedule packets in a plurality of flows to a corresponding one of a plurality of interfaces, each of the packets including a flow identifier for identifying a corresponding one of the plurality of flows, the scheduler comprising: a processor; memory having stored thereon instructions, which when executed by the processor implement the steps of: assigning sections within a predefined range to corresponding ones of the plurality of interfaces; for each packet, applying a hash function to the flow identifier to obtain a hash value, the hash function configured to evenly distribute the hash value within the predefined range; for each packet, determining in which of the sections the hash value falls and identifying the corresponding one of the plurality of interfaces accordingly.

In accordance with a further aspect of the present invention, there is provided a computer readable medium having stored thereon instructions for scheduling packets in a plurality of flows to a corresponding one of a plurality of interfaces, each of the packets including a flow identifier for identifying a corresponding one of the plurality of flows, the instructions, when executed by a processor, operable to perform the steps of: assigning sections within a predefined range to corresponding ones of the plurality of interfaces; for each packet, applying a hash function to the flow identifier to obtain a hash value, the hash function configured to evenly distribute the hash value within the predefined range; for each packet, determining in which of the sections the hash value falls and identifying the corresponding one of the plurality of interfaces accordingly.

DETAILED DESCRIPTION OF THE PREFERRED EMBODIMENTS

Figure 1:
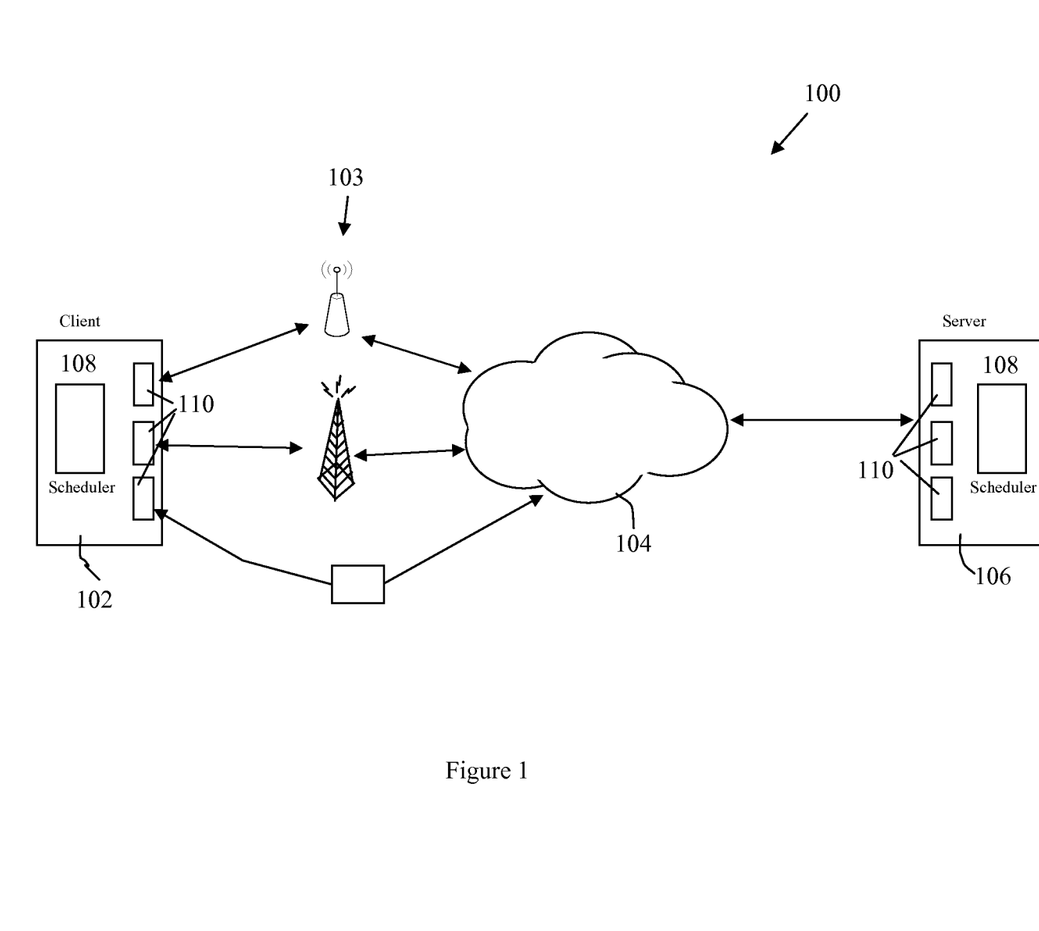
FIG. 1 is a block diagram illustrating a sample multi-interface system (prior art)

Referring to FIG. 1, a sample multi-interface system is illustrated generally by numeral 100. The multi-interface system comprises a client 102, a plurality of access points 103, a network 104, and a server 106. The client includes a scheduler 108 and a plurality of interfaces 110. Similarly, the server 106 includes the scheduler 108 and the plurality of interfaces 110. The access points 103 are configured to facilitate transfer of data between a corresponding one of the interfaces 110 and the network 104.

The interfaces 110 can include wireless local area network interfaces, such as Wi-Fi, wireless wide are network interfaces, such as the 3G or 4G mobile telecommunication standards, or hard-wired network interfaces, such as Ethernet.

The multi-interface system 100 is described for illustration purposes only. For example, in a practical application, the plurality of interfaces 110 will not be physically located at the server 106, but likely at an edge server or servers in the network 104. Various other methods, known or proprietary, can be implemented without affecting the present invention, as will be appreciated by a person of ordinary skill in the art.

Thus, in order to distribute flows across the plurality of interfaces 110, a scheduling algorithm implemented by the scheduler 108 includes a hash function. In the present context, a flow refers to a set of ordered packets that are logically part of the same communication between an application on the client 102 and the server 106.

Each of the packets transmitted between the client 102 and the server 106 includes a flow identifier that identifies the flow to which it is associated. The hash function is applied to the flow identifier of each packet to determine to which of the interfaces 110 the packet is associated. Since all packets in a flow will have the same flow identifier, all packets in a flow will be routed over the same interface. In this manner, a table is not required to manage the distribution of the flows. Moreover, less overhead bandwidth is required to synchronize the schedulers 108 at the client 102 and the server 106. The scheduling algorithm and its implementation are described in more detail below.

In Internet Protocol (IP) network systems, there exist transport protocols such as Transmission Control Protocol (TCP), User Datagram Protocol (UDP), Stream Control Transmission Protocol (SCTP), and others that are used by applications to transmit and receive data from a single application between endpoints in the network. In IP networks, endpoints are uniquely represented by an IP address. Similarly, applications are uniquely represented on each endpoint by one or more transport protocol port addresses. When an application attempts to communicate with the server 106, it generates a local port that will receive data sent by the server 106. This mechanism of generating a port on the client is referred to as generating an ephemeral port, since the port is only valid for the duration of the session. The combination of source address, source port, destination address, destination port, and protocol type, is referred to as a five-tuple.

Depending on the transport protocol, the flow may be uniquely identified by just the source and destination IP address plus protocol type. However, when the transport protocol has a port number, such as in the case of TCP, UDP or SCTP, the five-tuple uniquely identifies the flow.

Each TCP, SCTP, and UDP packet contains two port numbers; a source port and a destination port. Typically, one of the port numbers is a well-known port number, such as port number 80 for Hyper Text Transfer Protocol (HTTP). This port number is usually associated with the server 106 and is not very useful, since every application could use several flows with the same well-known port number. The other port number, however, known as an "ephemeral port number", is a short-lived, automatically allocated number. The ephemeral port number is generated for each new flow and is maintained as long as the flow is active. Once the flow terminates, the ephemeral port number can be reassigned. For packets that are sent from the client 102 to the server 106, the ephemeral port number is the source port. For packets that are sent from the server 106 to the client 102, the ephemeral port number is the destination port number.

Since it is unknown at implementation which side of the connection is the client 102 and which side is the server 106, the port number ranges can be used to make the determination. Well-known port numbers are typically issued from a central registry—traditionally operated by the Internet Assigned Numbers Authority (IANA), and these values are typically assigned in the range from 0 to several thousand. IANA has recommended that ephemeral ports be allocated from 49,152 to 65,535. That is, the well-known port numbers have relatively small values and ephemeral port numbers have relatively large values. Thus, for each packet the flow identifier is determined to be the larger of the port numbers. Since the port numbers are already included in a header of the packets, no additional bandwidth is required.

Alternatively, the scheduler 108 at the client 102 can be programmed to use the source port as the flow identifier and the scheduler 108 at the server 106 can be programmed to use the destination port as the flow identifier.

The flows, and consequently the packets, are assigned to different interfaces based on their flow identifier. In the present embodiment, the port number is a 16-bit number, so the address space is 65,536 address. However, because ephemeral port numbers are typically assigned sequentially, it is difficult to assign flow identifiers to interfaces effectively.

Figure 2:
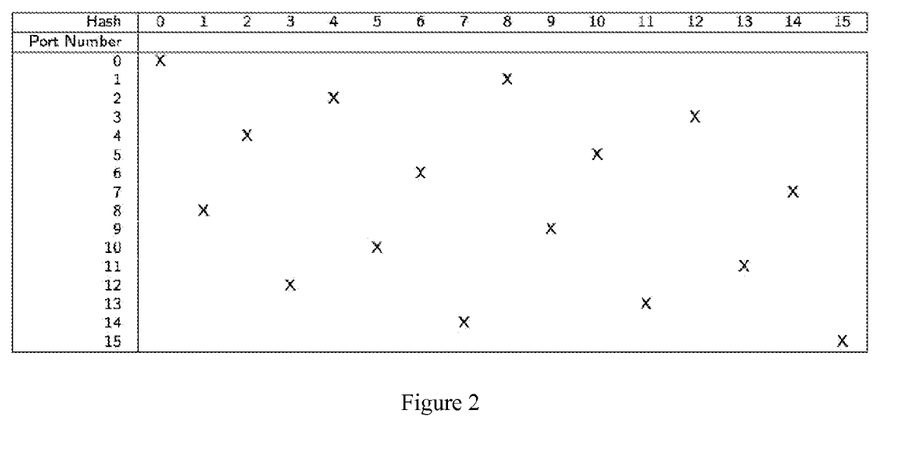
FIG. 2 is a graph illustrating the distribution of flow identifiers after being processed by a hash function.

Accordingly, a hash function is configured to distribute the sequentially generated flow identifiers relatively evenly in the address space. In the present embodiment, the hash function reverses the order of the bits in the 16-bit flow identifier resulting in a hash value. The resulting 16-bit hash value "points" to a specific spot in the range from 0-65535. This particular hash function has interesting characteristics for sequential values. Referring to Table 1, port numbers, reverse-bit values and resulting hash values are listed. For ease of explanation only 4-bit values are shown. Referring to FIG. 2, a graph illustrating the distribution of the hashed value of the port number is illustrated by numeral 200.

TABLE 1

| Port Number | Port in Bits | Hashed Bits | Hashed Value |
|---|---|---|---|
| 0 | 0000 | 0000 | 0 |
| 1 | 0001 | 1000 | 8 |
| 2 | 0010 | 0100 | 4 |
| 3 | 0011 | 1100 | 12 |

TABLE 1-continued

| Port Number | Port in Bits | Hashed Bits | Hashed Value |
|---|---|---|---|
| 4 | 0100 | 0010 | 2 |
| 5 | 0101 | 1010 | 10 |
| 6 | 0110 | 0110 | 6 |
| 7 | 0111 | 1110 | 14 |
| 8 | 1000 | 0001 | 1 |
| 9 | 1001 | 1001 | 9 |
| 10 | 1010 | 0101 | 5 |
| 11 | 1011 | 1101 | 13 |
| 12 | 1100 | 0011 | 3 |
| 13 | 1101 | 1011 | 11 |
| 14 | 1110 | 0111 | 7 |
| 15 | 1111 | 1111 | 15 |

Considering the example illustrated in Table 1, assume only four flows are generated. Without applying the hash function, the port numbers assigned to the flows are 0, 1, 2 and 3, which are difficult to distribute across different interfaces given their proximity across the range of 16 possible values. However, after applying the hash function the port numbers have corresponding hash values of 0, 8, 4 and 12, respectively. Since these numbers are much more evenly distributed across the range of 16 possible values, it becomes easier to distribute them across the different interfaces, as will be described below.

Figure 3:
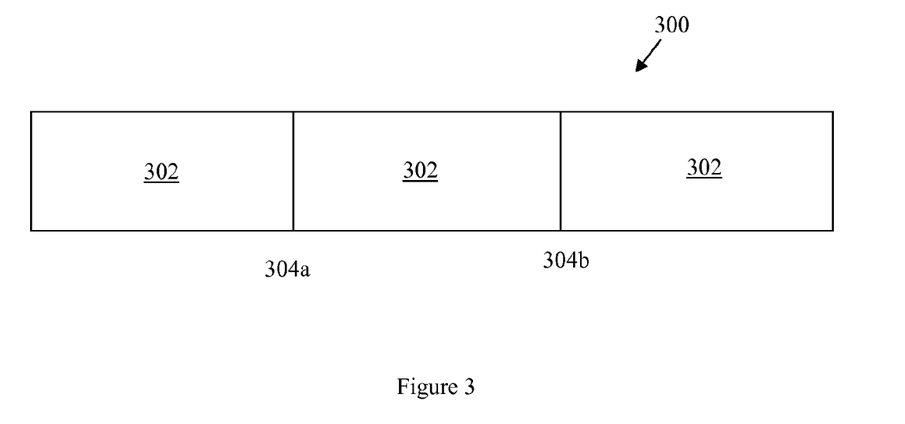
FIG. 3 is a block diagram illustrating an address range divided into sections.

Referring to FIG. 3, a block diagram illustrating the address space is illustrated generally by numeral 300. The address space 300 is divided into sections 302. The number of sections 302 corresponds with the number of interfaces 110 available. The sections 302 are defined by thresholds 304. Assignment of a threshold value for the thresholds 304 can be static or dynamic. For example, if there are three interfaces 110 and all three interfaces 110 are expected to have the same available bandwidth, the address space can be divided in a mostly equal fashion. Thus, a first threshold 304a is set at 22,000 and a second threshold is set at 44,000. Packets are routed via a corresponding one of the interfaces by applying the hash function to the flow identifier. If the resulting hash value is from 0 to the first threshold 304a then the packet is routed via a first one of the interfaces 110. If the resulting hash value falls between the first threshold 304a and the second threshold 304b then the packet is routed via a second one of the interfaces 110. If the resulting hash value is from the second threshold 304b to 65,535 then the packet is routed via a third one of the interfaces 110.

Alternatively, if the different interfaces 110 have different available bandwidths, then the first and second thresholds 304a and 304b are set to weight the address space accordingly. For example, if the first one of the interfaces 110 accounts for 20% of the overall bandwidth, the second one of the interfaces accounts for 30% of the overall bandwidth and the third one of the interfaces accounts for 50% of the overall bandwidth, then the first threshold 304a can be set at 13,000 and the second threshold 304b can be set at 33,000.

Further, the thresholds 304 can be modified dynamically in response to changing conditions at the interfaces 110. For example, if the bandwidth of the first one of the interfaces 110 decreases, then the first threshold 304a is lowered to compensate. The second threshold 304b is also adjusted so as not to overload the second one of the interfaces. In addition to the bandwidth, other network conditions can be used to adjust the thresholds 304. Scheme used to determine link quality, either known or proprietary, may be used.

Accordingly, it will be appreciated that the relatively even distribution of the hash values of the flow identifiers allows flows, and therefore packets, to be assigned to a corresponding interface 110 simply by segmenting the address space and assigning the hash value of the flow identifier to an interface 110 accordingly.

Figure 4:
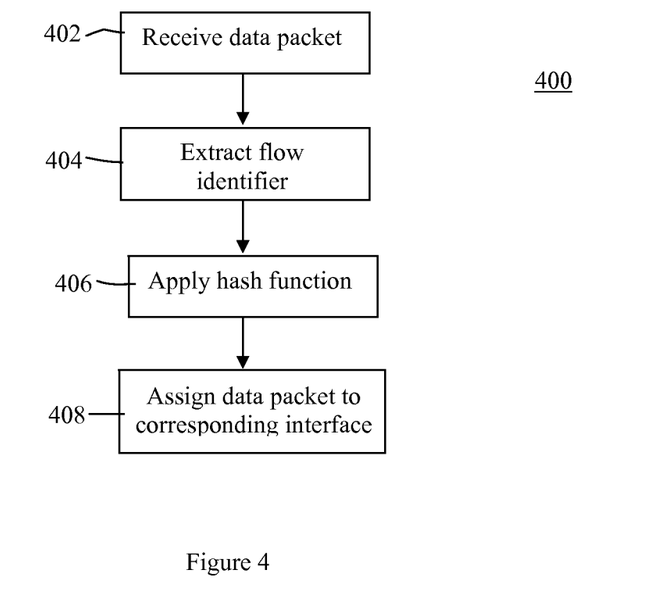
FIG. 4 is a flow chart illustrating operation of a scheduling algorithm.

Referring to FIG. 4, a flow chart illustrating the steps taken by the scheduler 108 to implement the scheduling algorithm described above is illustrated generally by numeral 400. At step 402, a data packet is received at the scheduler.

At step 404, the scheduler extracts the flow identifier from the data packet. As previously described, in the present embodiment the higher of the two port numbers associated with the data packet is the ephemeral port number and, thus, the flow identifier.

At step 406 the scheduler applies the hash function to determine a hash value for the flow identifier. As described above, in the present embodiment the hash function is a reversal of the bits of the flow identifier.

At step 408, the data packet is assigned to one of the interfaces 110 based on the determined hash value. As described above, the hash value is compared with a plurality of thresholds 304 to determine to which of the interfaces the data packet should be assigned. Continuing the previous example of three possible interfaces, if the hash value falls between 0 and the first threshold 304a, then the data packet is assigned to the first one of the interfaces 110. If the hash value falls between the first threshold 304a and the second threshold 304b, then the data packet is assigned to the second one of the interfaces 110. If the hash value falls between the second threshold 304b and 65,535, then the data packet is assigned to the third one of the interfaces 110. Each data packet within the same flow will have the same flow identifier and, therefore, the same hash value. Thus, each data packet in a flow will be scheduled over the same interface, unless the thresholds 304 change.

In summary, the scheduling algorithm described herein is highly efficient because the amount of data it stores grows only based upon the number of interfaces available to the system instead of the number of flows present. Given that each device is unlikely to have more than a handful of interfaces at any given point in time, a much smaller amount of data needs to be stored on the client and the server, making it easier to scale.

Additionally, much less data needs to be synchronized between the client and server. Specifically, all that needs to be synchronized are the values that mark the different sections 302 assigned to each interface within the 16-bit address space.

If the network conditions do not change then no additional data needs to be transmitted. It is only when a link changes enough to require a change in the thresholds 304 that an update is required.

Thus, no complex data structure is required to store this data. Indeed storing the portion of the 16-bit space assigned to each interface requires no more than a single 16-bit entry in an array that is the same size as the number of interfaces 110 available. Such a solution is less error-prone than traditional solutions and requires less implementation complexity.

Finally, it is not required to expire entries from the table, since there is no table. Since information is being stored about the interfaces 110 rather than the flows, such issues disappear.

The scheduling algorithm described above ensures a good distribution of flows across the plurality of interfaces 110 depending, at least in part, on network characteristics. However, an even distribution of flows is not always sufficient for efficient utilization of the available interfaces. For example, although a client may have established fifty flows, only three of these flows are actually being used to transmit data at any significant rate. If all three of the flows happen to have been assigned to the same one of the interfaces 110, the data distribution will be poor even though good flow distribution will have been achieved. To help address this issue, the scheduling algorithm further analyses the bandwidth within each of the sections 302 of the address range to determine if one or more of the plurality of interfaces 110 is being underutilized. If it is determined that one or more of the plurality of interfaces 110 is being underutilized, the thresholds 304 may be adjusted accordingly, as will be described below.

Figure 5:
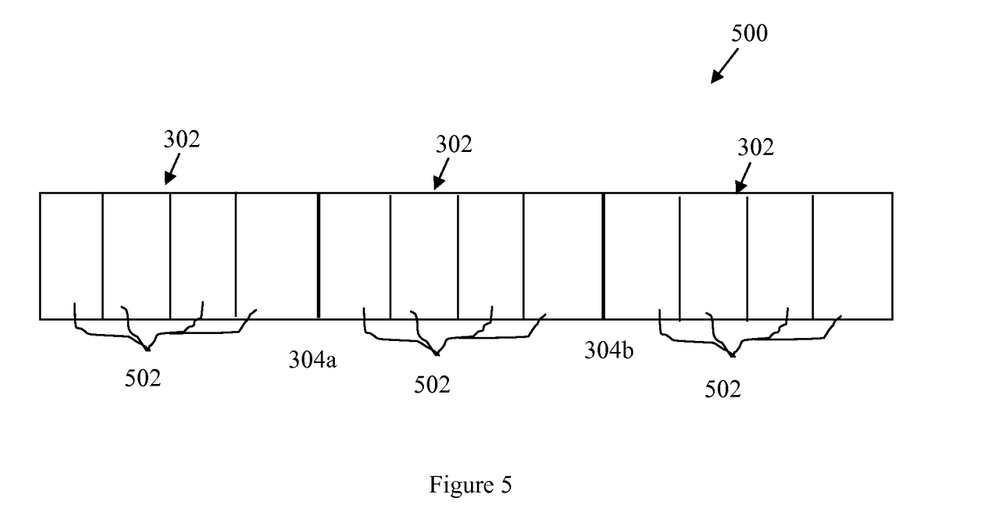
FIG. 5 is a block diagram of the address range in FIG. 3, further divided into subsections

Referring to FIG. 5, a block diagram illustrating the address space is illustrated generally by numeral 500. Continuing the previous example, the 16-bit address range from 0-65,535 is segmented into a plurality of sections 302 based on the number of interfaces 110 available. The boundaries of the sections are set by threshold 304 based upon how much traffic it is determined to allocate to each interface, assuming that each flow will generate a relatively equal amount of traffic per flow.

To facilitate modifying the thresholds 304 in cases where a small number of flows are generating a majority of traffic, each section 302 is divided into a plurality of subsections 502. In the present embodiment, each section 302 is divided into four subsections 502 as that has been determined to provide sufficient granularity for the analysis, without requiring a significant amount of storage space. However, a different number of subsections 502 may be used depending on the implementation.

For each subsection, the scheduler 308 records the total number of bytes that have been transmitted by flows that have a hash value associated therein. Thus, it becomes possible to start adjusting the thresholds 304 based upon the amount of data each flow has sent.

For a predefined accumulation time period, the scheduler 108 examines the number of bytes sent across each one of the interfaces 110, and determines if the distribution of traffic across the interfaces matches the desired distribution. If one of the interfaces 110 is transmitting a higher proportion of traffic than desired then a rebalancing algorithm is executed to bring the traffic distribution closer to the desired distribution. However, it will be appreciated that it will often not be able to distribute the traffic in an ideal fashion. Accordingly, if the distribution of traffic is only off the ideal distribution by a small amount then nothing is done to avoid computational overhead for minimal gain. The value of the small amount can vary depending on the implementation and the requirements placed on the scheduler. Yet further, the rebalancing algorithm also determines whether or not rebalancing the distribution of traffic will improve or worsen the end result.

Figure 6:
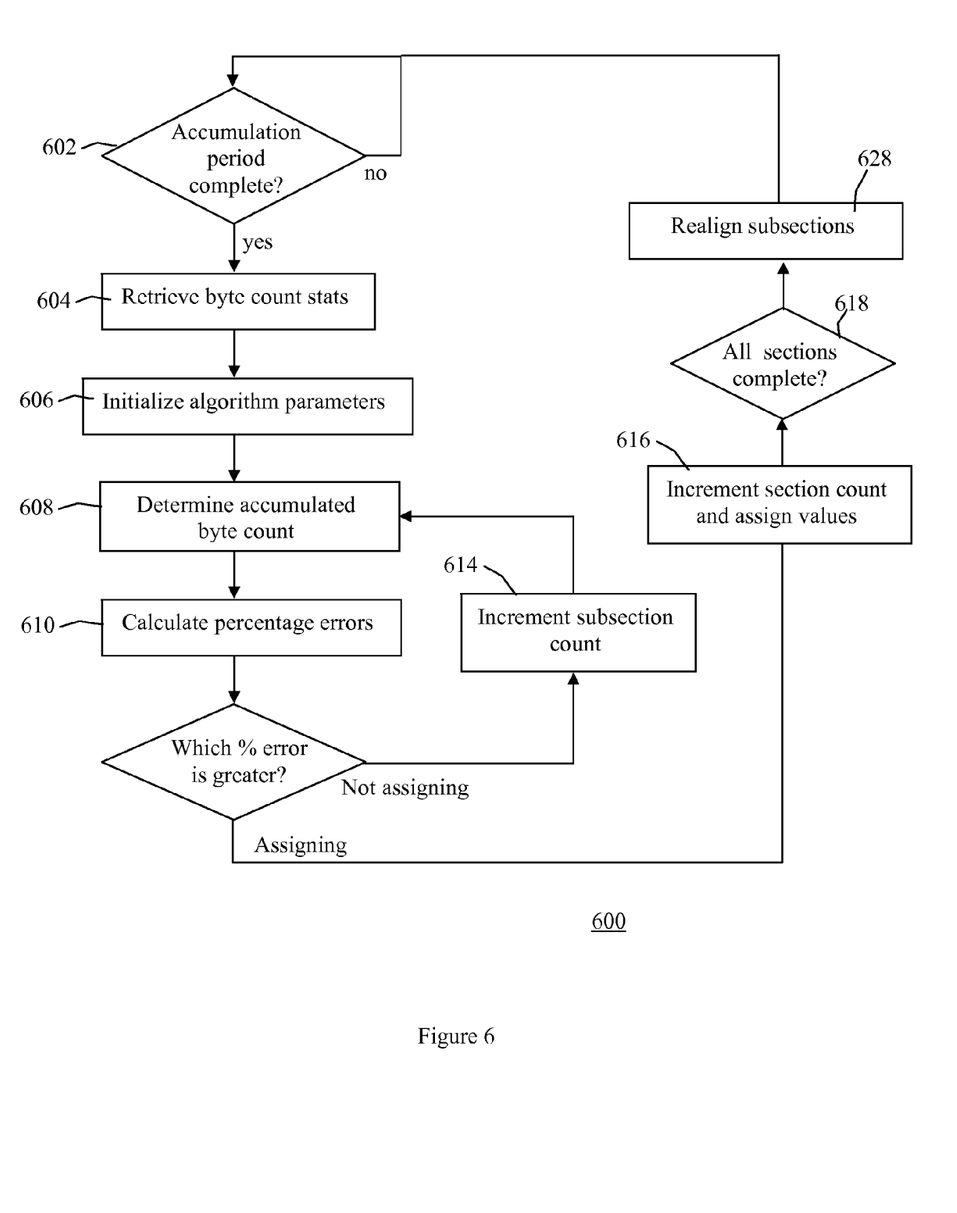
FIG. 6 is a flow chart illustrating operation of a rebalancing algorithm

Referring to FIG. 6, the rebalancing algorithm is described in greater detail as follows. As described with reference to FIG. 5, the address range is divided into n (in FIG. 5, n=3) sections 302 based on the number of available interfaces. Each of the sections if further divided into m (in FIG. 5, m=4) subsections 502.

At step 602, it is determined whether or not the accumulation period has passed. Once the accumulation period has passed the rebalancing algorithm continues at step 604. At step 604, the rebalance algorithm retrieves the statistics from the scheduler 108 regarding the number of bytes transmitted via each one of the subsections 502 and calculates a total transmitted byte count accordingly. At step 606, the rebalancing algorithm starts the first one of the subsections by setting a subsection count to 1, a section count to 1 and an accumulated bandwidth to 0.

At step 608, the rebalancing algorithm retrieves the amount of data transmitted for the subsection identified by the subsection count and adds it to the accumulated byte count.

At step 610, the rebalancing algorithm calculates a percentage error that would result from: assigning the current subsection to the interface identified by the subsection count; and not assigning the current subsection to the interface identified by the subsection count.

In the present embodiment the percentage error from assigning the current subsection to the interface is determined by comparing the ratio of the accumulated byte count to total byte count with the desired distribution for the section. The percentage error from not assigning the current subsection to the interface is determined by comparing the ratio of the accumulated byte count, less the byte count of the current subsection, to total byte count with the desired distribution percentage for the section.

In an alternate embodiment, adjusting the thresholds is determined recursively. In this embodiment, the rebalancing algorithm runs itself recursively given both possible decisions to assign or not assign a given subsection to the current section. The rebalancing algorithm selects the result with the lower percentage error.

At step 612, it is determined which of the percentage errors calculated at step 610 is greater. If the percentage error from assigning the subsection to the interface identified by the section count is less than the error of not assigning it, then the rebalancing algorithm continues at step 614. At step 614, the subsection count is incremented and the rebalancing algorithm returns to step 610.

If the percentage error from assigning the subsection to the interface identified by the section count is greater than the error of not assigning it, then the rebalancing algorithm continues at step 616. At step 616, the section count is incremented, the accumulated byte count is reset to 0 and the threshold 304 is adjusted to correspond with the upper address of the last subsection, that is the subsection identified by the subsection count less one.

At step 618, it is determined if all of the sections 302 has been resized. In the present embodiment, this is achieved by determining if the section count is equal to the number of sections m. If the section count is less than m then the rebalancing algorithm returns to step 610. If the section count is equal to m, then all of the sections 302 have been resized. At step 620, each of the new sections 302 are divided into four equal subsections 502 and the rebalancing algorithm starts anew.

The rebalancing algorithm can be performed independently on the client 102 and the server 106. However, this may result in a transient period where the thresholds 304 on the client 102 and the server 106 are not perfectly aligned. Since the client 102 and the server 106 are each independently calculating the thresholds, the corresponding schedulers 108 will eventually converge onto the same result. This delay may not be important, depending on the type of Internet traffic generated. If, however, it is important to not have either scheduler diverge in behavior, it is possible for one of the client 102 or the server 106 to send an update to the other when the thresholds 302 are recalculated.

Figure 7:
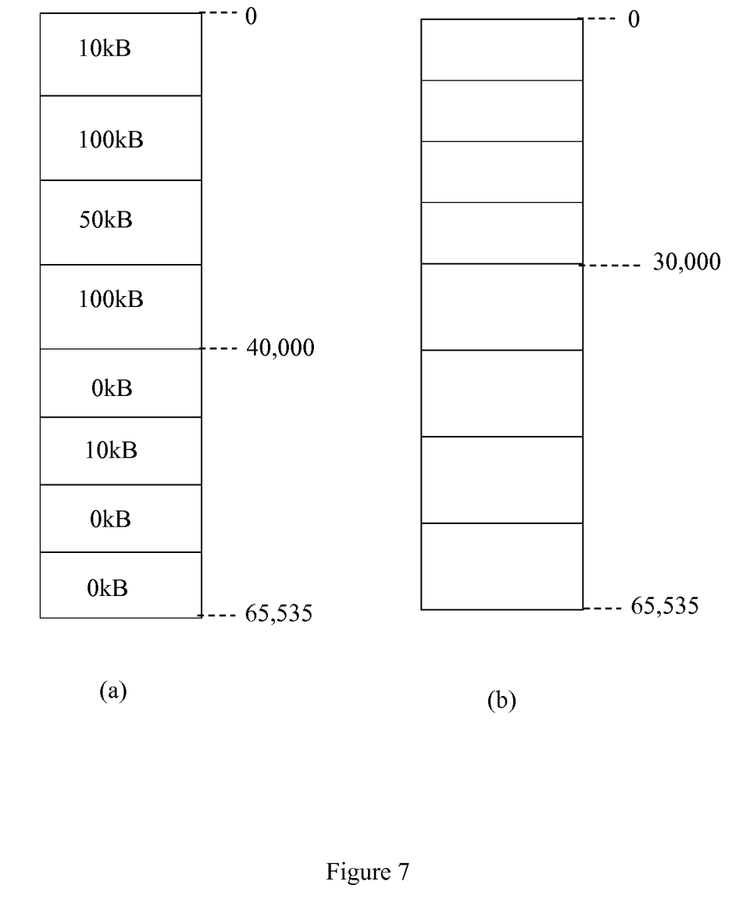
FIGS. 7a and 7b are block diagrams illustrating rebalancing of the section.

Referring to FIGS. 7a and 7b, an example of the affect of the rebalancing algorithm on the distribution of the threshold is an address range is shown. Referring first to FIG. 7a, it is initially established that there are two interfaces 110 and, thus, two sections 302. Due to network conditions it is desirable to split the flow distribution by 60% to a first section and 40% to a second section. Accordingly, the threshold is set at 40,000. This number is approximated for illustrative purpose only.

The first section is divided into four equal subsections: 0 to 10,000; 10,001 to 20,000; 20,001 to 30,000; and 30,001 to 40,000. Similarly, the second section is divided into four subsections: 40,001 to 46,384; 46,385 to 52,768; 52,769 to 59,152; and 59,153 to 65,535. The byte count for the each of the subsections during the accumulation period is determined to be 10 kB, 100 kB, 50 kB, 100 kB, 0 kB, 10 kB, 0 kB and 0 kB respectively. Thus the total utilized bandwidth is 270 kB.

Since it is desirable that the first interface receives 60% of the traffic, ideally 162 kB of data would be transmitted there through. However, a quick inspection of FIG. 7a reveals that 260 kB are being transmitted through the first interface, well above the desired amount.

Accordingly, the rebalancing algorithm determines where to move the threshold as follows. The byte count of the first subsection is analyzed. Since 10 kB is closer than 0 kB to 162 kB, the first subsection is included in the first section. The byte count of the second subsection is then analyzed. Since 110 kB is closer than 10 kB to 162 kB, the second subsection is included in the first section. The byte count of the third subsection is then analyzed. Since 160 kB is closer than 110 kB to 162 kB, the third subsection is included in the first section. The byte count of the fourth subsection is then analyzed. Since 260 kB is further than 160 kB from 162 kB, the fourth subsection is not included in the first section. Accordingly, the threshold is moved to 30,000.

Since there are only two sections, only one threshold needs to be determined. Accordingly, the subsections are recalculated to represent four equal portions of their corresponding sections. Specifically, the first section is divided into four equal subsections: 0 to 7,500; 7,501 to 15,000; 15,001 to 22,500; and 22,501 to 30,000. Similarly, the second section is divided into four subsections: 30,001 to 38,884; 38,885 to 47,767; 47,768 to 56,653; and 56,654 to 65,535.

As illustrated above, restructuring the sections and corresponding subsections provides an increased resolution in areas of interest. Consider, for example, the first section. Initially, the threshold was set at 40,000 and the subsections were 10,000 possible hash values in size. However, due to a greater than expected byte count in the first section, the threshold was moved to 30,000. The subsections were resized accordingly to 7,500 possible hash values, thereby increasing resolution in the section that is demonstrating the higher byte count. In contrast, the subsections in the second section increase in size, therefore decreasing in resolution, but in an area with less activity.

Thus, the rebalancing algorithm rearranges the thresholds 304 based on the use of the flows. Accordingly, if the data transmitted by each flow does not change significantly then the rebalancing algorithm will not change the thresholds 304.

Although the embodiments described above reference a particular hash function and rebalancing algorithm, variations may be implement without affecting the desired result. Yet further, if it is determined that a particular hash function is not yielding a sufficiently even distribution of flows, the scheduler 108 may fall back to a secondary, or even tertiary, hash function to improve the result.

Yet further, several examples are provided herein for illustrative purposes. For ease of explanation only, the percentages may not match up exactly with the specific numbers used. The ability to tolerate such variations will vary depending on the implementation.

Using the foregoing specification, the invention may be implemented as a machine, process or article of manufacture by using standard programming and/or engineering techniques to produce programming software, firmware, hardware or any combination thereof.

Any resulting program(s), having computer-readable instructions, may be stored within one or more computer-usable media such as memory devices or transmitting devices, thereby making a computer program product or article of manufacture according to the invention. As such, the terms "software" and "application" as used herein are intended to encompass a computer program existent as instructions on any computer-readable medium such as on any memory device or in any transmitting device, that are to be executed by a processor.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations and combinations may be made thereto without departing from the scope of the appended claims.

The invention claimed is:

1. A scheduler configured to schedule packets in a plurality of flows to a corresponding one of a plurality of interfaces, each of the packets including a flow identifier for identifying a corresponding one of the plurality of flows, the scheduler comprising:
    a processor;
    memory having stored thereon instructions, which when executed by the processor implement the steps of:
        assigning sections within a predefined range to corresponding ones of the plurality of interfaces;
        selecting an ephemeral port number associated with the flow to be used as the flow identifier by comparing port numbers for each packet and selecting a larger one of the port numbers, wherein an ephemeral port range is higher than a predefined known port range;
        for each packet, applying a hash function to the flow identifier to obtain a hash value, the hash function configured to evenly distribute the hash value within the predefined range; and
        for each packet, determining in which of the sections the hash value falls and identifying the corresponding one of the plurality of interfaces accordingly.

2. The scheduler of claim 1, wherein the ephemeral port number is:
   a source port for packets transmitted from a client to a server; or
   a destination port for packets transmitted from the server to the client.

3. The scheduler of claim 1, wherein the hash function reverses the order of bits in the flow identifier.

4. The scheduler of claim 1, wherein each of the sections within the predefined range is substantially equal.

5. The scheduler of claim 1, wherein each of the sections within the predefined range is assigned based on anticipated performance of the corresponding one of the plurality of interfaces.

6. The scheduler of claim 1, wherein each of the sections within the predefined range is dynamically modified based on performance metrics of the corresponding one of the plurality of interfaces.

7. The scheduler of claim 1 comprising further instructions for changing the hash function if it is determined that the hash values are not evenly distributed within the predefined range.

8. A scheduler configured to schedule packets in a plurality of flows to a corresponding one of a plurality of interfaces, each of the packets including a flow identifier for identifying a corresponding one of the plurality of flows, the scheduler comprising:
   a processor;
   memory having stored thereon instructions, which when executed by the processor implement the steps of:
      assigning sections within a predefined range to corresponding ones of the plurality of interfaces;
      for each packet, applying a hash function to the flow identifier to obtain a hash value, the hash function configured to evenly distribute the hash value within the predefined range;
      for each packet, determining in which of the sections the hash value falls and identifying the corresponding one of the plurality of interfaces accordingly;
      determining performance for each of the sections over a predefined accumulation period;
      comparing the determined performance with a corresponding anticipated performance and adjusting the size of each of the sections accordingly.

9. The scheduler of claim 8, wherein performance for each of the sections is determined by dividing each of the sections into a plurality of subsections and maintaining a byte count of data transmitted by flows having a hash value associated with each of the subsections.

10. The scheduler of claim 9, wherein the determined performance is compared with the corresponding anticipated performance by determining the byte count of the section and comparing it with an anticipated byte count of the section.

11. The scheduler of claim 10, wherein the size of each of the sections is adjusted by assigning one or more contiguous subsections to an adjacent section to more closely match the determined byte count of the section with the anticipated byte count of the section.

12. The scheduler of claim 11, wherein adjusting the size of each of the sections improves accuracy of the scheduler due to an increased resolution when determining the performance for each of the sections as a result of a decrease in subsection size.

13. A non-transitory computer readable medium having stored thereon instructions for scheduling packets in a plurality of flows to a corresponding one of a plurality of interfaces, each of the packets including a flow identifier for identifying a corresponding one of the plurality of flows, the instructions, when executed by a processor, operable to perform the steps of:
   assigning sections within a predefined range to corresponding ones of the plurality of interfaces;
   selecting an ephemeral port number associated with the flow to be used as the flow identifier by comparing port numbers for each packet and selecting a larger one of the port numbers, wherein an ephemeral port range is higher than a predefined known port range;
   for each packet, applying a hash function to the flow identifier to obtain a hash value, the hash function configured to evenly distribute the hash value within the predefined range;
   for each packet, determining in which of the sections the hash value falls and identifying the corresponding one of the plurality of interfaces accordingly.

14. The non-transitory computer readable medium of claim 13, wherein the hash function reverses the order of bits in the flow identifier.

15. The non-transitory computer readable medium of claim 13, wherein each of the sections within the predefined range is substantially equal.

16. The non-transitory computer readable medium of claim 13, wherein each of the sections within the predefined range is assigned based on anticipated performance of the corresponding one of the plurality of interfaces.

17. The non-transitory computer readable medium of claim 13, wherein each of the sections within the predefined range is dynamically modified based on performance metrics of the corresponding one of the plurality of interfaces.

18. The non-transitory computer readable medium of claim 13 comprising further instructions for changing the hash function if it is determined that the hash values are not evenly distributed within the predefined range.

19. A non-transitory computer readable medium having stored thereon instructions for scheduling packets in a plurality of flows to a corresponding one of a plurality of interfaces, each of the packets including a flow identifier for identifying a corresponding one of the plurality of flows, the instructions, when executed by a processor, operable to perform the steps of:
   assigning sections within a predefined range to corresponding ones of the plurality of interfaces;
   for each packet, applying a hash function to the flow identifier to obtain a hash value, the hash function configured to evenly distribute the hash value within the predefined range;
   for each packet, determining in which of the sections the hash value falls and identifying the corresponding one of the plurality of interfaces accordingly;
   determining performance for each of the sections over a predefined accumulation period; and
   comparing the determined performance with a corresponding anticipated performance and adjusting the size of each of the sections accordingly.

20. The non-transitory computer readable medium of claim 19, wherein performance for each of the sections is determined by dividing each of the sections into a plurality of subsections and maintaining a byte count of data transmitted by flows having a hash value associated with each of the subsections.

21. The non-transitory computer readable medium of claim 20, wherein the determined performance is compared with the corresponding anticipated performance by determining the byte count of the section and comparing it with an anticipated byte count of the section.

22. The non-transitory computer readable medium of claim 21, wherein the size of each of the sections is adjusted by assigning one or more contiguous subsections to an adjacent section to more closely match the determined byte count of the section with the anticipated byte count of the section.

23. The non-transitory computer readable medium of claim 22, wherein adjusting the size of each of the sections improves accuracy of the scheduler due to an increased resolution when determining the performance for each of the sections as a result of a decrease in subsection size.

* * * * *